March 29, 1949.

W. A. KOSTER ET AL 2,465,885

SIX SPEED TRANSMISSION WITH SUPERPOSED
PLANETARY TRANSMISSION

Filed June 14, 1944

INVENTORS
WILLIAM A. KOSTER
GUY E. SOPER
BY

ATTORNEYS

INVENTORS
WILLIAM A. KOSTER
GUY E. SOPER
BY
Hoguet, Neary & Campbell
ATTORNEYS

Patented Mar. 29, 1949

2,465,885

UNITED STATES PATENT OFFICE 2,465,885

SIX-SPEED TRANSMISSION WITH SUPER-
POSED PLANETARY TRANSMISSION

William A. Koster, Highland Park, and Guy E.
Soper, New Brunswick, N. J., assignors to Mack
Manufacturing Corporation, New York, N. Y.,
a corporation of Delaware Application June 14, 1944, Serial No. 540,242

14 Claims. (Cl. 74—328)

1

The present invention relates to transmission mechanisms for motor vehicles and embodies more specifically an improved transmission mechanism which affords an increased range of speed changes over those of conventional transmissions while preserving the operation thereof as an operation accomplished by the use of only one shift lever.

Numerous attempts have heretofore been made to provide transmissions having extended ranges, such attempts utilizing supplementary gear change mechanisms to, in effect, multiply the number of speed changes afforded by the primary transmission, or in other ways add speed change elements to the primary transmission to accomplish the result, but such existing mechanisms have usually required either two or more shift levers or the shift pattern of a single shift lever has been such as to render the resulting transmission impractical in operation.

An object of the present invention, accordingly, is to provide an improved transmission mechanism for use particularly in motor vehicles, wherein an extended range of shifts is available by means of a mechanism utilizing a conventional shift lever, the pattern of movement of which follows any conventional pattern or sequence without altering its nature.

A further object of the invention is to provide a transmission mechanism wherein an extended range of speed change positions is secured by means of the utilization of a main transmission mechanism of generally conventional nature upon which is superposed a planetary mechanism, the entire unit being operated by an integrated control mechanism which enables the operator to select an extended number of speed changes in a pattern which has become one of the generally accepted patterns for gear shift mechanisms.

Further objects of the invention will be apparent as it is described in greater detail in connection with the accompanying drawings, wherein

Figure 3 is an enlarged view in section, show-

2 ing the elements of the planetary transmission shown in Figure 1;

Figure 1:
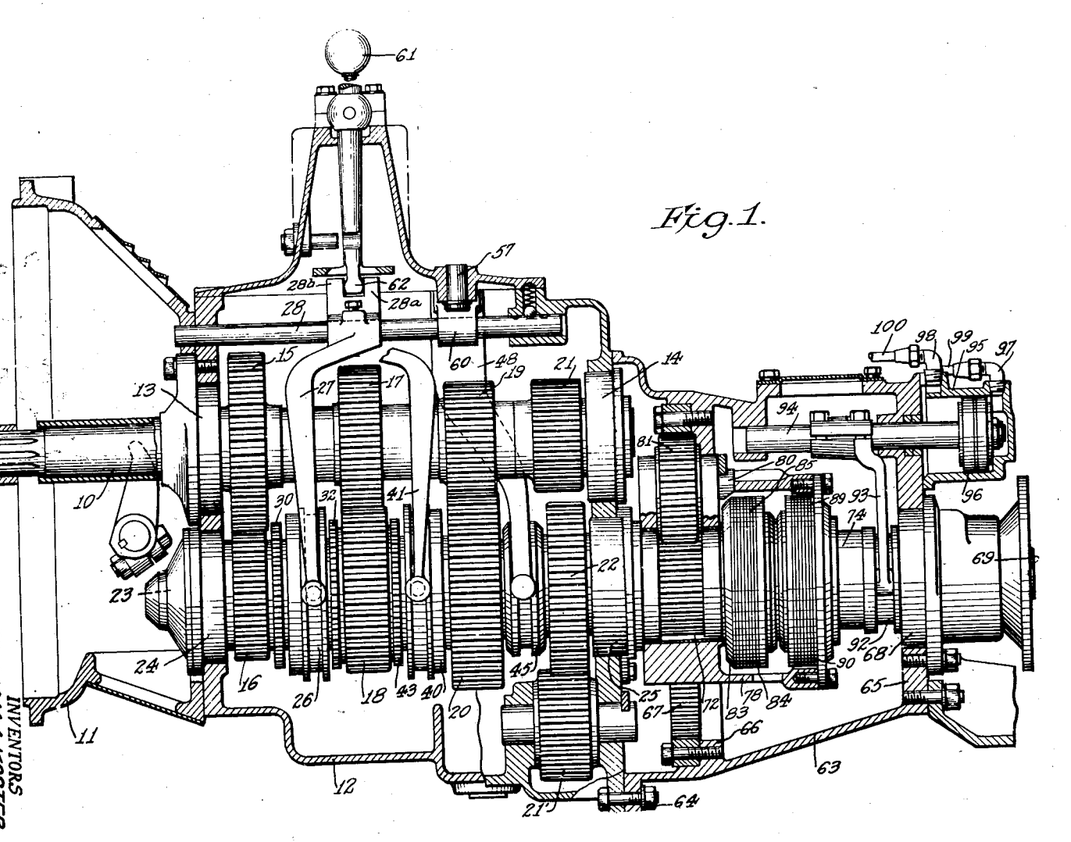
Figure 1 is a longitudinal view in section, taken through a transmission mechanism constructed in accordance with the present invention and showing the elements of the primary and superposed planetary transmissions, as well as certain elements of the shift control mechanism.
Figure 2:
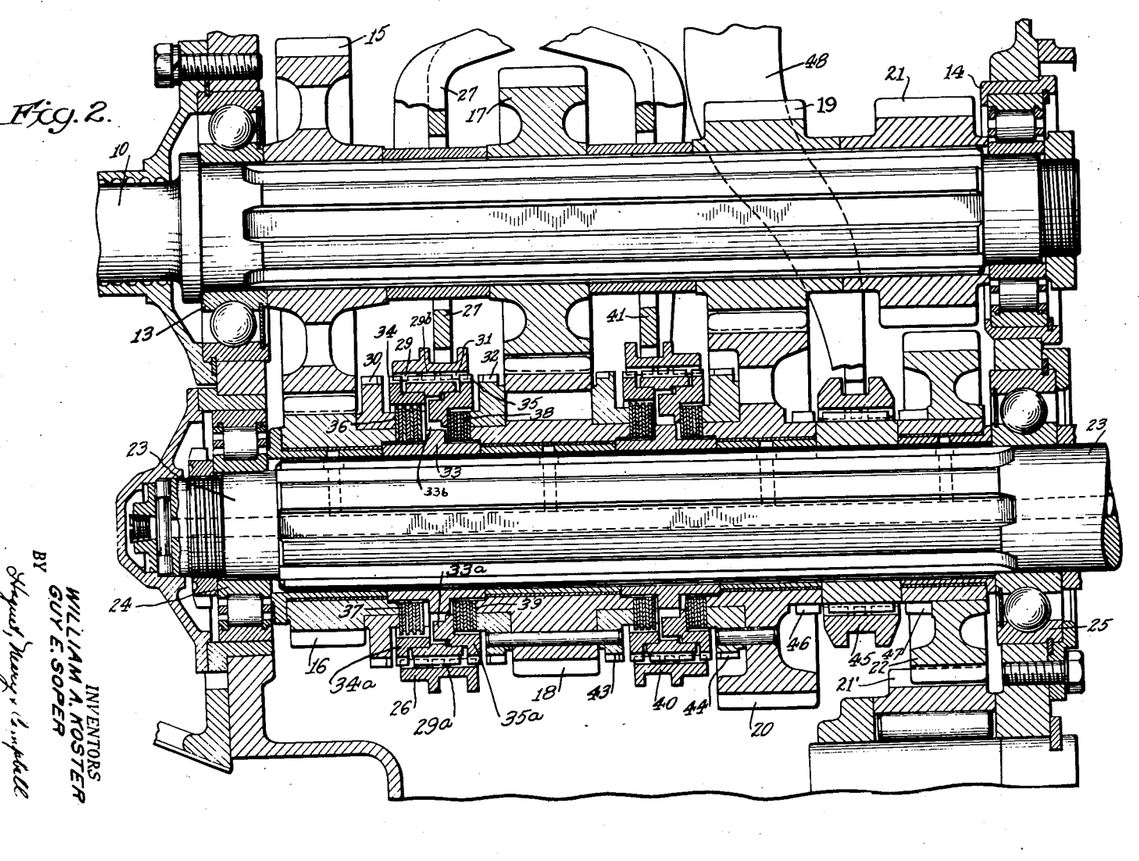
Figure 2 is an enlarged view in section, showing the elements of the primary transmission of Figure 1.

Referring particularly to Figures 1 and 2, the power input of the transmission described herein is shown as being a shaft 10 within a clutch housing 11 of conventional form. A main transmission housing 12 is secured to the adjacent face of the clutch housing, the shaft 10 being journaled at 13 and 14 therein. Upon shaft 10 are fixedly secured gears 15, 17, 19 and 21 which are adapted to be in constant mesh, respectively, with gears 16, 18, 20 and 21', the reverse idler 21' being included between and meshing with gears 21 and 22, but being shown out of its position in Figure 1 in the interest of clearness. Inasmuch as this reverse idler simply follows standard transmission practice, it is not believed necessary to show it in detail.

Gears 16, 18, 20, and 22 are rotatably mounted upon shaft 23 which is journaled in the main transmission housing at 24 and 25.

Between gears 16 and 18 there is provided an axially shiftable clutch collar 26, actuated by a shifter fork 27, on the upper extremity of which are formed, upwardly extending fingers 28a and 28b. Shifter fork 27 is secured to shifter rod 28. The clutch collar 26 is formed with internal clutch teeth 29, 29b and 31, the said clutch collar being axially shiftably mounted on fixed clutch member 33 by means of clutch teeth 29a formed on said clutch member 33. Fixed clutch member 33 is fixedly mounted on shaft 23. The clutch teeth 29 are adapted to operate against mating teeth 34 formed on balk ring 34a which carries friction discs 36, the said balk ring 34a having a limited rotary motion with respect to fixed clutch member 33, as determined by lugs 33a operating in holes 33b formed in member 33. Initial shift movement of the clutch collar 26 in a leftwardly direction as viewed in Figure 2 causes a pressure to be applied to balk ring 34a, and consequently to friction discs 36 and 37; said pressure being transmitted through angular surfaces on the fronts of engaging teeth 29 and 34. Friction discs 36 operate against similar friction discs 37 mounted on gear 16 and when under pressure, an action is obtained which results in synchronization of the speeds of gear 16 and shaft 23, fixed clutch 33 and sliding collar 26. Upon synchronization, teeth 29 are able to pass over the angular surfaces on teeth 34, slip through teeth 34 and engage teeth 30 on gear member 16, thereby clutching said gear 16 to shaft 23 through clutch collar 26 and fixed clutch 33. Movement of the clutch collar in a rightwardly direction produces a similar action in that gear member 18 is brought into synchronization with and clutched to shaft 23 by means of balk ring 35a, teeth 35, teeth 32, internal teeth 31, and the plurality of friction discs 38 and 39; each of the said members being similar in operation to members already herein described.

The details of the foregoing mechanism form no part of the present invention and are illustrated in the application of Kenneth D. Bull, Serial No. 433,004, filed March 2, 1942, now Patent #2,397,943, April 9, 1946. Such mechanism serves to bring the gear 16 into synchronous rotation with the shaft 23 prior to its engagement therewith through the fixed clutch 33 and collar 26 and also, if the collar 26 is moved to the right, to bring the gear 18 into synchronous rotation therewith. In this connection, it is to be observed that the fixed clutch 33 is splined to the shaft 23 and driven thereby and that the teeth 34 and 35 have a limited rotary motion with respect to the sleeve 33.

Between gears 18 and 20 a slidable collar 40 is provided, the collar being operated by a shifter fork 41.

Figure 6:
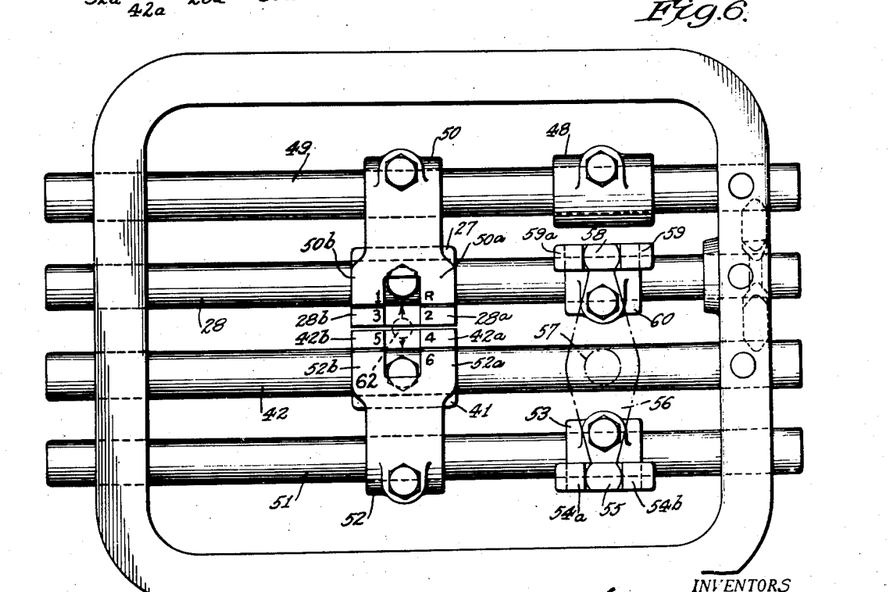
Figure 6 is a plan view of the shifter control mechanism shown at the top of the main transmission in Figure 1.

The shifter fork 41 is mounted upon a shifter rod 42, Figure 6, and is formed with upwardly extending and offset fingers 42a and 42b. The slidable collar 40, Figure 2, actuates a clutch mechanism similar to the mechanism actuated by the collar 26 to cause the teeth of the slidable clutch element to engage teeth 43 on gear 18 upon movement of the collar to the left, or, teeth 44 on gear 20 upon movement of the collar to the right.

Between gears 20 and 22, Figure 2, there is provided a slidable collar 45 actuating a clutch similar to the clutches previously described (except for the absence of synchronizing elements) as being actuated by collars 26 and 40 to accomplish engagement of the slidable clutch teeth actuated by the collar 45 with clutch teeth 46 mounted upon gear 20 upon movement of the collar to the left and clutch teeth 47 mounted upon gear 22 upon movement of the collar to the right.

A shifter fork 48 actuating clutch collar 45 is mounted upon a shifter rod 49, Figure 6, the shifter rod 49 being provided with a clamp 50 secured thereto and having laterally projecting fingers 50a and 50b.

Shifter rod 28, Figure 6, is also operated by a second shifter rod 51 having a clamp 52 secured thereto and formed with fingers 52a and 52b. The shifter rod 51 is also provided with a clamp 53 having upwardly extending fingers 54a and 54b between which is received end 55 of a beam 56 pivoted at 57 in the transmission cover. The other end 58 of the beam is received within similar fingers 59 and 59a formed on clamp 60 which is secured to the shifter rod 28. Movement of the shifter rod 51 will thus be imparted to the shaft 28, the latter moving in opposite directions from the movement of the rod 51.

Figure 5:
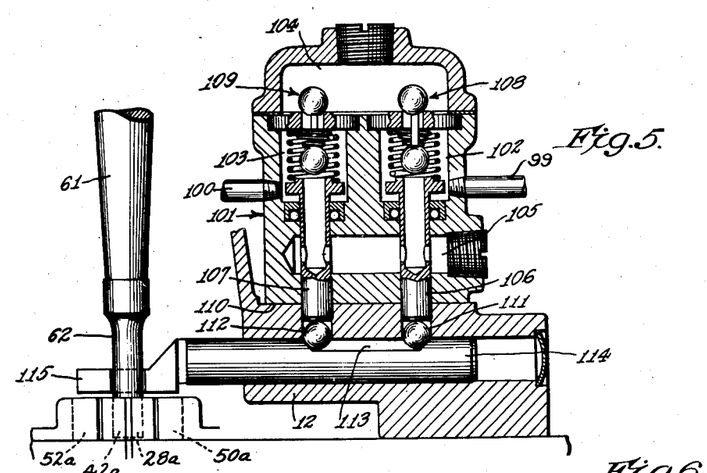
Figure 5 is an enlarged detail view in section, showing the mechanism by means of which the operation and control of the planetary transmission is accomplished.

The mechanism hereinabove described is actuated by means of a shifter lever 61, Figure 5, having a finger 62 formed on the lower extremity thereof adapted to engage between the fingers of the clamps and fork secured on the respective shifter rods as hereinabove described.

The shift pattern is illustrated in Figure 6 and the shifting operation is as follows:

Movement of the shift lever can cause the finger 62 to engage between the fingers 50a and 50b and sets the shift so that, upon movement of the shifter rod 49 to the right, as viewed in Figure 6, the shifter fork 48 causes gear 22 to clutch the shaft 23 and the reverse gear position is established. Movement of the lever in the opposite direction, while the shifter finger is in the same position causes the rod 49 to be moved in the reverse direction and the gear 20 is clutched to the counter-shaft 23 setting the mechanism in the first or low gear position.

Movement of the shift lever 61 to bring the finger 62 between fingers 28a and 28b enables the second and third speed positions to be engaged. While in such position, if the finger 62 is moved to the right, as viewed in Figure 6, the shifter rod 28 is correspondingly moved to cause the clutch teeth of clutch 26 to clutch gear 18 to the counter-shaft 23, thus establishing the second speed position.

Movement of the shifter rod 28 in the opposite direction causes gear 16 to be clutched to shaft 23 and establishes the third speed position.

Movement of the shifter lever 61 to bring the finger 62 between the fingers 42a and 42b then establishes the necessary stage wherein shifter rod 42, when moved to the right, as viewed in Figure 6, causes shifter fork 41 to move the clutch 40 to engage gear 20 with counter-shaft 23.

As will be presently described, a simultaneous operation of the planetary mechanism provides a gear change operation between the counter-shaft 23 and a driven shaft so that, in this condition, gear 20, when clutched to the counter-shaft 23, provides a fourth speed connection. Movement of the finger in the opposite direction to move the shifter rod 42 correspondingly, causes the clutch 40 to engage gear 18 with the shaft 23 at the same time the planetary gear change has been performed, thus providing a fifth speed connection.

Movement of the shifter lever 61 to bring the shift finger 62 between the fingers 52a and 52b provides the final setting so that, when the finger 62 is moved to the right, as viewed in Figure 6, finger 52a is engaged to move shift rod 51 to the right. This movement is transmitted to the shifter rod 28 to move it to the left so that shifter fork 27 is moved to the left to engage gear 16 with the counter-shaft 23. This takes place during the gear change position of the planetary previously referred to and thus provides a sixth speed connection.

Figure 3:
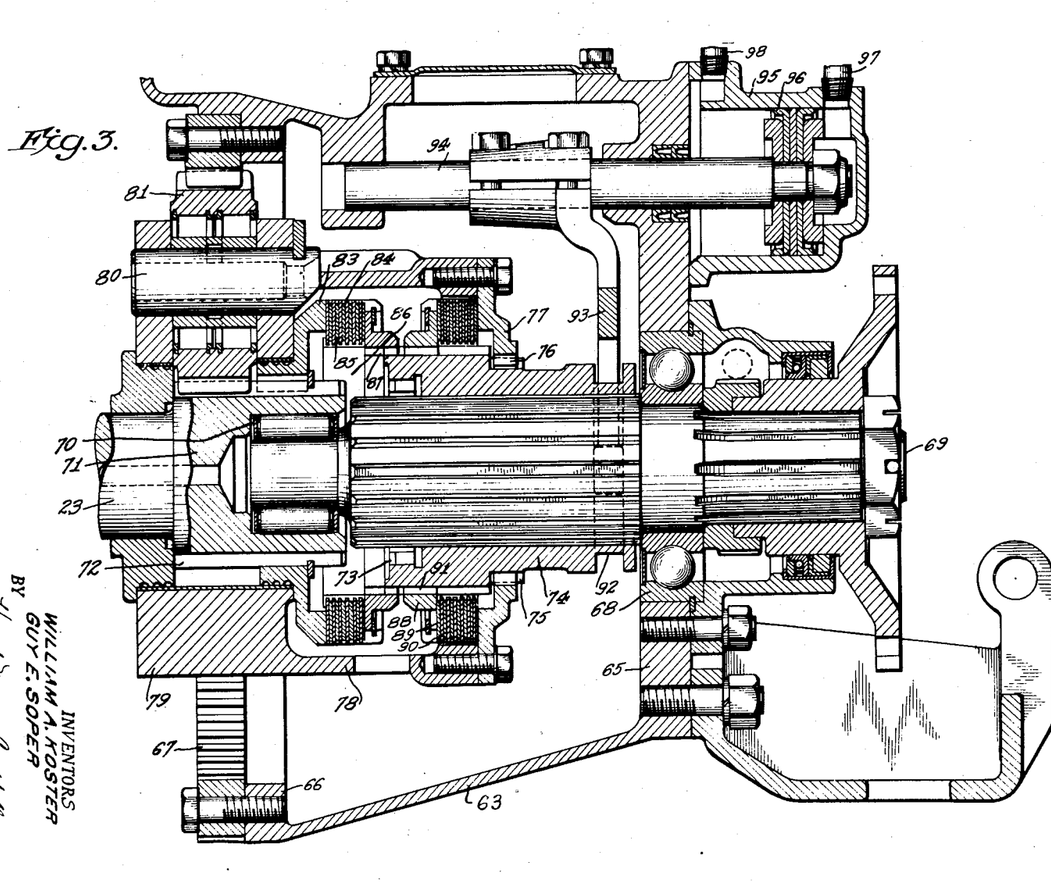
Figure 4:
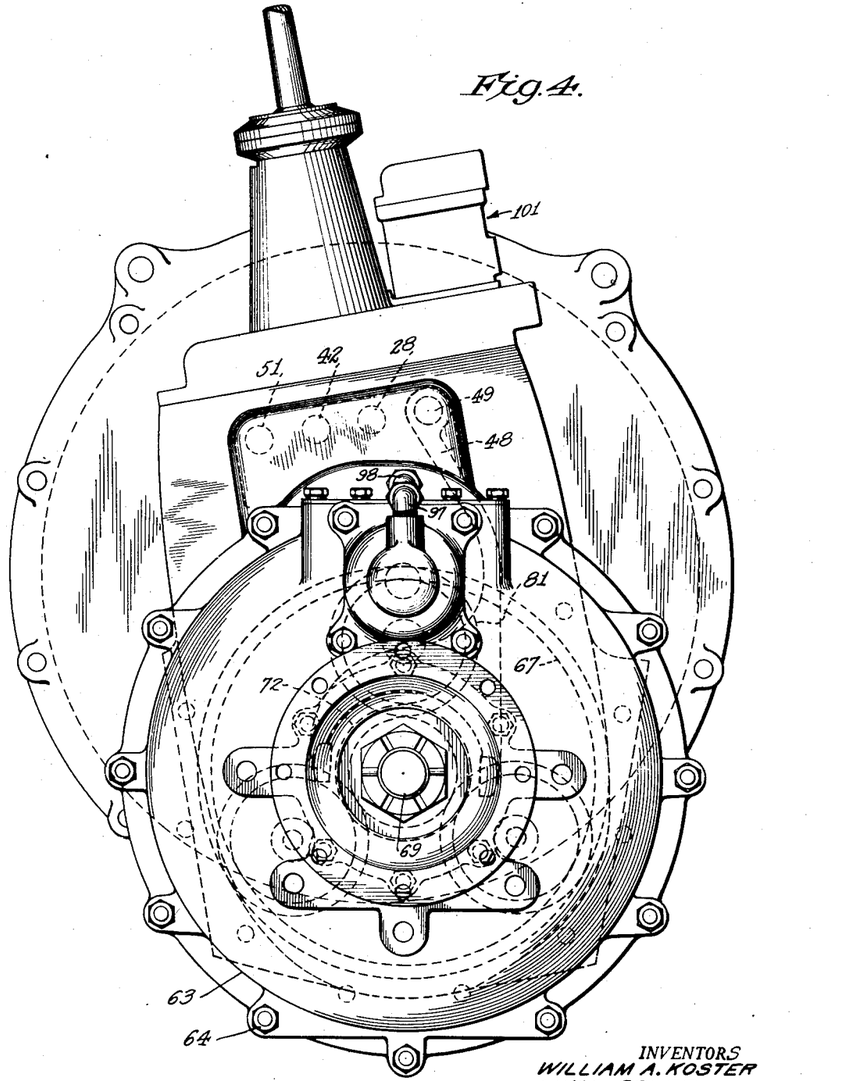
Figure 4 is a view in end elevation, taken from the right of Figure 1.

In order that the gears of the main transmission, previously described, may be utilized over an extended range of gear positions, the counter-shaft 23, Figures 1 and 3, at its driving end is received within an auxiliary housing 63 which is flanged and clamped to the main housing by means of bolts 64 and provided with an end wall 65. Between the ends of the auxiliary housing an inwardly extending annular flange 66 is formed to which an internal ring gear 67 is secured. A bearing 68 is provided in the end wall 65 to mount a driven shaft 69 which is journaled at 70 in an enlarged shaft section 71 formed in the end of the counter-shaft 23. Gear teeth 72 are formed on the shaft section 71 and form the sun gear of a planetary gear transmission mechanism. The gear teeth 72 also serve as clutch teeth, their right hand extremities adapted to be engaged by inner clutch teeth 73 which are formed upon a sleeve 74 splined to the shaft 69 but slidable thereon. External clutch teeth 75 are also formed on the sleeve 74 and are adapted to engage internal clutch teeth 76 formed on a disc 77 mounted upon a drum 78 which is a part of the planet pinion carrier 79. The planet pinion carrier is provided with a plurality of pinion shafts 80 upon which planet pinions 81 are journaled, pinions 81 engaging the sun gear teeth 72 and the ring gear teeth 67.

Upon the extension 71 of the counter-shaft 23 is provided a spider 83 which rotates therewith. This spider carries a plurality of friction discs 84 thereon to cooperate with a plurality of similar discs 85 mounted upon a drum 86 formed with a plurality of inwardly extending balk teeth 87. A similar drum 88 is formed with friction discs 89 similar to discs 85 and interleaved with discs 90 mounted upon the drum 78. Balk teeth 91 are provided on the drum 88 similar to teeth 87. The sleeve 74 is formed with spaced balk teeth similar to the balking structure shown in the aforesaid co-pending application of Kenneth D. Bull and the structure thus provides a mechanism by means of which the rotation of shafts 69 and 23 may be synchronized as well as the rotation of shaft 69 and the drum 78.

The sleeve 74 is shifted axially by means of a collar 92 formed therein, the collar being engaged by a shifter fork 93 secured upon a shifter rod 94 slidably mounted in the auxiliary transmission housing 63 and extending through the end wall 65 thereof into a cylinder 95, Figures 1 and 3. A piston 96 is formed on the rod 94 and thus actuates the rod in accordance with air pressure introduced into the cylinder on opposite sides of the piston. To accomplish such actuation, fittings 97 and 98 are provided. Fitting 97 is connected to a pipe 99, while fitting 98 is connected to a pipe 100. Pipes 99 and 100 are connected to a valve assembly 101, Figure 5, communicating, respectively, with chambers 102 and 103. Air under pressure is introduced into a pressure manifold 104 and an exhaust manifold 105 is provided in the base of the assembly. Chamber 102 is provided with a valve rod 106 while chamber 103 is provided with a valve rod 107, both valve rods being hollow and providing communication between the respective chambers 102, 103 and the exhaust manifold 105. Each valve rod cooperates with a double ball dumbbell valve member shown, for example, at 108 and 109, respectively. These ball valve members control communication not only between the pressure manifold 104 and the respective chambers 102 and 103, but also between the respective chambers 102, 103 and the exhaust manifold 105.

Although air is specified as the working medium for this particular structure, operation is not to be limited to it alone as other means are possible alternates, viz. hydraulic fluids, vacuum systems or a combination of two or more of these methods.

The transmission housing 12 is provided with a mounting surface 110 within which balls 111 and 112 are received. The balls are adapted to bear upon the lower extremities of the valve rods 106 and 107, respectively, and to be received within a slot 113 formed in a rail 114. The rail is formed with a keeper plate 115 formed with a slot to receive the finger 62 formed on the shifting lever 61. In neutral position (the position shown in Figure 5), the rail 114 permits both of the rods 106 and 107 to be pushed down by their springs out of contact with the lower balls of the dumbbell valves 108 and 109 thereby connecting the chambers 102 and 103 to the atmosphere. In this position the upper balls of the dumbbell valves 108 and 109 prevent the pressure in chamber 104 from entering the chambers 102 and 103. Upon movement of the shift finger 62 to the right, as viewed in Figure 5, corresponding to a movement of the finger upwardly in Figure 6, the rail 114 is moved to the right and ball 112 and valve rod 107 are raised to close the passage between the chamber 103 and the exhaust port and to connect the chamber 104 to the chamber 103. As a result, air under pressure flows into chamber 103 and through the pipe 100 into the left-hand side of the piston 96, Figures 1 and 3. This causes the piston to move to the right and, as will be seen in Figure 3, to engage the driven shaft 69 with the counter-shaft 23 through the planetary transmission mechanism. Movement of the finger 62 in a contrary position controls the double ball valve 108 in a similar manner and accomplishes operation of the shifter fork 93 and sleeve 74 in an opposite direction to engage teeth 73 with gear teeth 72, thus to establish a direct drive.

To recapitulate, the transmission mechanism of the present invention affords six forward speeds and one reverse speed. As previously stated, movement of the shifting lever from neutral position into a position for shifting into reverse or first, or into second or third gears, causes the rail 114 of the air control mechanism to actuate the sleeve 74 to engage teeth 75 with teeth 76, thus to cause the driven shaft 69 to be driven through the planetary mechanism mounted within the planetary transmission housing 63. In such position of the planetary transmission mechanism, a planetary speed reduction is readily superposed upon the ratio provided by any of the gear speed changes provided by the main transmission mechanism, shown in Figure 2. Thus is provided, as previously described, the reverse gear connection and the first, second and third speed gear connections.

As the shift lever is rocked transversely into the positions for establishing the fourth, fifth and sixth speed positions, the rail 114 is moved to the left to raise the valve rod 106 and permit the valve rod 107 to drop. As a result, the air under pressure in manifold 104 no longer flows into the chamber 103 but now flows into chamber 102. Chamber 103 is connected through the hollow valve rod 107 with the exhaust manifold 105 and chamber 102 communicates with the pressure manifold 104. Air then flows through the pipe 99 and into the cylinder 95 on the right-hand end of the piston 96. The sleeve 74 is, therefore, shifted to the left to cause teeth 73 to engage the gear teeth 72 and establish a direct drive connection between shafts 23 and 69. The direct drive, instead of including the planetary mechanism, thus steps up the speed of the driven shaft by the amount of the planetary speed reduction and shifting of the gears of the main transmission of the fourth, fifth and sixth speed positions affords the continued progressive gear change operations essential to mechanisms of this character.

It is to be observed that the large step afforded by the planetary mechanism is possible by means of using the synchronizer mechanism hereinabove described, inasmuch as it establishes synchronism between the relatively rotating shafts prior to engagement of the clutch teeth.

It is also to be observed that gears 18 and 20 are double clutched, that is, both sides are utilized for the respective positions by means of which the progressive gear positions are obtained. For example, gear 20 serves as the first and fourth speed gear connection while gear 18 serves as the second and fifth speed connection.

It will also be seen, from an inspection of Figure 6, that the progression of the shift operations follows a conventional pattern which is familiar to operators.

While the invention has been described with reference to the specific structure disclosed in the accompanying drawings, it is not to be limited save as defined in the appended claims.

We claim:

1. A transmission mechanism having first and second shafts and comprising a plurality of sets of speed change gears in a driven relationship to the first shaft, means to engage any one of the sets, selectively, in a drive transmitting relationship to the second shaft, whereby a range of speed change ratios is provided; an auxiliary speed change mechanism in a driven relationship to the second shaft, the ratio of the auxiliary mechanism being greater than any of the ratios provided by the preceding plurality of sets of speed change gears; an auxiliary shaft, means to engage said auxiliary shaft, selectively, in a drive transmitting relationship to either the second shaft or to the auxiliary speed change mechanism, a gear shift member movable to a first series of positions for engaging said sets selectively and to another series of positions for engaging said sets selectively, and means responsive to movement of said gear shift member for engaging said auxiliary shaft to said auxiliary mechanism when said gear shift member is in said first series of positions, and for engaging said auxiliary shaft to said second shaft when said gear shift member is in said another series of positions.

2. A transmission mechanism having first and second shafts and comprising a plurality of sets of speed change gears in a driven relationship to the first shaft, means to engage any one of the sets, selectively, in a drive transmitting relationship to the second shaft, whereby a range of speed change ratios is provided; an auxiliary planetary gear speed change mechanism in a driven relationship to the second shaft, the ratio of the auxiliary mechanism being greater than any of the ratios provided by the preceding plurality of sets of speed change gears; an auxiliary shaft, means to engage said auxiliary shaft, selectively, in a drive transmitting relationship to either the second shaft or to the auxiliary planetary gear speed change mechanism, a gear shift member movable to a first series of positions for engaging said sets selectively and to another series of positions for engaging said sets selectively, and means responsive to movement of said gear shift member for engaging said auxiliary shaft to said auxiliary mechanism when said gear shift member is in said first series of positions, and for engaging said auxiliary shaft to said second shaft when said gear shift member is in said another series of positions.

3. A transmission mechanism comprising a main change speed transmission providing a range of ratios and having an output shaft, an auxiliary speed change mechanism having a ratio greater than any of the ratios provided by the main speed change transmission; an auxiliary shaft, means to engage said auxiliary shaft selectively in a drive transmitting relationship either to the auxiliary speed change mechanism or to the main change speed transmission output shaft, a gear shift member movable to a first series of positions for engaging said sets selectively and to another series of positions for engaging said sets selectively, and means responsive to movement of said gear shift member for engaging said auxiliary shaft to said auxiliary mechanism when said gear shift member is in said first series of positions, and for engaging said auxiliary shaft to said second shaft when said gear shift member is in said another series of positions.

4. A transmission mechanism comprising a main change speed transmission providing a range of ratios and having an output shaft, an auxiliary planetary gear speed change mechanism having a ratio greater than any of the ratios provided by the main speed change transmission; an auxiliary shaft, means to engage said auxiliary shaft selectively in a drive transmitting relationship either to the auxiliary planetary gear speed change mechanism or to the main change speed transmission output shaft, a gear shift member movable to a first series of positions for engaging said sets selectively and to another series of positions for engaging said sets selectively, and means responsive to movement of said gear shift member for engaging said auxiliary shaft to said auxiliary mechanism when said gear shift member is in said first series of positions, and for engaging said auxiliary shaft to said second shaft when said gear shift member is in said another series of positions.

5. A transmission mechanism having first and second shafts and comprising a main change speed transmission having a plurality of sets of speed change gears in a driven relationship to the first shaft, means to engage one of the sets, selectively, in a drive transmitting relationship between the said first and second shafts, whereby a range of speed change ratios is provided; an auxiliary speed change mechanism in a driven relationship to the said second shaft, the ratio of the auxiliary mechanism being greater than any of the ratios provided by the preceding plurality of speed change gears in the main transmission; an auxiliary shaft, a first clutch mechanism between said auxiliary shaft and second shaft, a second clutch mechanism between said auxiliary shaft and auxiliary speed change mechanism, a gear shift member movable to a first series of positions for engaging said sets selectively and to another series of positions for engaging said sets selectively, and means responsive to movement of said gear shift member for actuating said second clutch mechanism to connect said third shaft to said auxiliary mechanism when said gear shift member is in said first series of positions and for actuating said first clutch mechanism to connect said third shaft to said second shaft when said gear shift member is in said another series of positions.

6. A transmission mechanism having first and second shafts and comprising a main change speed transmission having a plurality of sets of speed change gears in a driven relationship to the first shaft, means to engage any one of the sets, selectively, in a drive transmitting relationship between the said first and second shafts, whereby a range of speed change ratios is provided; an auxiliary planetary gear speed change mechanism in a driven relationship to the said second shaft, the ratio of the auxiliary mechanism being greater than any of the ratios provided by the preceding plurality of speed change gears in the main transmission; an auxiliary shaft, a first clutch mechanism between said auxiliary shaft and second shaft, a second clutch mechanism between said auxiliary shaft and auxiliary planetary gear speed change mechanism, a gear shift member movable to a first series of positions for engaging said sets selectively and to another series of positions for engaging said sets selectively, and means responsive to movement of said gear shift member for actuating said second clutch mechanism to connect said third shaft to said auxiliary mechanism when said gear shift member is in said first series of positions and for actuating said first clutch mechanism to connect said third shaft to said second shaft when said gear shift member is in said another series of positions.

7. A transmission mechanism having first and second shafts and comprising a plurality of sets of speed change gears in a driven relationship to the first shaft, an auxiliary speed change mechanism in a driven relationship to the second shaft, the ratio of the auxiliary mechanism being greater than any of the preceding change speed ratios; a plurality of clutch means between the shafts to engage the second shaft directly to one of the sets of speed change gears, selectively, thus establishing a drive transmitting relationship between the first and second shafts, shifter forks for operating the last named clutch means, shifter rods for actuating respectively, each of said shifter forks, an independent shifter rod, means for connecting said shifter rod to one of the other shifter rods, and a common lever for engaging and operating said rods selectively.

8. A transmission mechanism having first and second shafts and comprising a plurality of sets of speed change gears in a driven relationship to the first shaft, an auxiliary planetary gear speed change mechanism in a driven relationship to the second shaft, the ratio of the auxiliary mechanism being greater than any of the preceding change speed ratios; a plurality of clutch means to engage the second shaft directly to one of the sets of speed change gears selectively, thus establishing a drive transmitting relationship between the first and second shafts, shifter forks for operating the last named clutch means, shifter rods for actuating, respectively, each of said shifter forks, an independent shifter rod, means for connecting said last named shifter rod to one of the other shifter rods, and a common lever for engaging and operating said rods selectively.

9. A transmission mechanism having first and second shafts and comprising a plurality of sets of speed change gears in a driven relationship to the first shaft, first clutch means to engage certain of the sets, selectively, in a relationship transmitting drive to the second shaft, second clutch means including dual clutch elements on at least one of the gear sets, shifter forks movable in opposite directions for actuating the second clutch means to engage the said one gear set through either of the dual clutch members, an auxiliary speed change gear train whose ratio is greater than any provided by the first named sets of speed change gears, a mechanism for shifting said auxiliary speed change gear train, a shifter lever and mechanism operated thereby for actuating the first clutch means selectively and for actuating one of the clutches of the said dual clutch elements, means operated by the shifter lever and mechanism operated thereby for actuating the auxiliary speed change gear train, and means operated by the shifter lever and mechanism operated thereby for actuating the other of the said dual clutch elements and for again operating the first clutch means.

10. A transmission mechanism comprising a change speed transmission for selectively changing the speed ratio between a drive shaft and a driven shaft, an auxiliary shaft, an auxiliary speed reduction mechanism driven by said driven shaft, means for connecting said auxiliary shaft selectively to said driven shaft or to said speed reduction mechanism, a gear shift member for said change speed mechanism to change said speed ratio in a first series of positions and movable to another series of positions also for changing said speed ratios, and means responsive to the operation of said gear shift member for connecting said auxiliary shaft to said speed reduction mechanism in said first series of positions of said gear shift member, and for connecting said auxiliary shaft to said driven shaft in said another series of positions of said gear shift member.

11. A transmission mechanism comprising a change speed transmission for selectively changing the speed ratio between a drive shaft and a driven shaft, an auxiliary shaft, an auxiliary speed reduction mechanism driven by said driven shaft, means for connecting said auxiliary shaft selectively to said driven shaft or to said speed reduction mechanism, a gear shift member for said change speed mechanism to change said speed ratio in a first series of positions equal to the number of speed ratios provided by said transmission, and movable to another series of positions also for changing said speed ratios, and means responsive to the operation of said gear shift member for connecting said auxiliary shaft to said speed reduction mechanism in said first series of positions of said gear shift member, and for connecting said auxiliary shaft to said driven shaft in said another series of positions of said gear shift member.

12. A transmission mechanism comprising first and second shafts, a plurality of sets of selectively operable change speed gears for connecting said shafts to provide a range of speed change ratios, a third shaft, an auxiliary change speed unit driven by said second shaft, means for coupling said third shaft selectively to said second shaft or to said auxiliary transmission, a gear shift member movable to a first series of positions for selecting said speed change ratios and to another series of positions also for selecting said speed change ratios, and means actuated by said shift member in said first series of positions for actuating said coupling means to connect said third shaft to said auxiliary transmission, and for coupling said third shaft to said second shaft in said another series of positions.

13. A transmission mechanism comprising a change speed transmission having a first and a second shaft, and a plurality of sets of change speed gears selectively operable to change the speed ratio between said shafts, a gear shift mechanism having a shift member for operating all of said gear sets to selectively change the speed ratio between said shafts, said shift member being movable into a first series of positions for changing said speed ratios, and into another series of positions corresponding to a series of different speed ratios than are provided by said gear sets, a third shaft, a speed reduction mechanism, and power operated means responsive to movement of said shift member for coupling said third shaft to said speed reduction mechanism when said shift member is in any of said first series of positions, and coupling said third shaft to said second shaft when said shift member is in any of said another series of positions.

14. A transmission mechanism comprising a change speed transmission having a first and a second shaft, and a plurality of sets of change speed gears selectively operable to change the speed ratio between said shafts, a gear shift mechanism having a shift member, a plurality of shift rods actuated by said shift member for operating all of said gear sets to selectively change the speed ratio between said shafts, said shift member being movable into a first series of positions for changing said speed ratios, and into another series of positions corresponding to a series of higher speed ratios than are provided by said gear sets, another shift rod actuated by said shift member in said another series of positions, means connecting said another shift rod to one of said plurality of shift rods, a third shaft, a speed reduction mechanism, and power operated means responsive to movement of said shift member for coupling said third shaft to said speed reduction mechanism when said shift member is in said first series of positions, and coupling said third shaft to said second shaft when said shift member is in said another series of positions.

WILLIAM A. KOSTER.
GUY E. SOPER.

REFERENCES CITED

The following references are of record in the file of this patent:

UNITED STATES PATENTS

| Number | Name | Date |
| --- | --- | --- |
| 654,632 | Heilmann | July 31, 1900 |
| 1,212,286 | Tullar | Jan. 16, 1917 |
| 1,342,195 | Walker | June 1, 1920 |
| 1,347,804 | Byrd | July 27, 1920 |
| 1,425,678 | Newhouse | Aug. 15, 1922 |
| 1,652,943 | Kaser | Dec. 13, 1927 |
| 1,745,075 | Wise | Jan. 28, 1930 |
| 1,776,633 | Libby | Sept. 23, 1930 |
| 1,777,997 | Wise | Oct. 7, 1930 |
| 1,916,891 | Padgett | July 4, 1933 |
| 2,194,823 | Dooley | Mar. 26, 1940 |
| 2,242,276 | Vincent | May 20, 1941 |
| 2,254,335 | Vincent | Sept. 2, 1941 |
| 2,348,424 | Shorter | May 9, 1944 |